US008178825B2

(12) United States Patent
Goossen et al.

(10) Patent No.: US 8,178,825 B2
(45) Date of Patent: May 15, 2012

(54) GUIDED DELIVERY OF SMALL MUNITIONS FROM AN UNMANNED AERIAL VEHICLE

(75) Inventors: Emray R Goossen, Albuquerque, NM (US); Steven D Martinez, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 459 days.

(21) Appl. No.: 12/259,728

(22) Filed: Oct. 28, 2008

(65) Prior Publication Data

US 2011/0017863 A1    Jan. 27, 2011

Related U.S. Application Data

(60) Provisional application No. 60/983,551, filed on Oct. 29, 2007.

(51) Int. Cl.
| | |
|---|---|
| *F41G 7/30* | (2006.01) |
| *F41G 7/22* | (2006.01) |
| *F42B 15/01* | (2006.01) |
| *F41G 7/00* | (2006.01) |
| *F42B 15/00* | (2006.01) |

(52) U.S. Cl. ...... 244/3.14; 244/3.1; 244/3.11; 244/3.15; 244/3.16; 382/100; 382/103; 382/104

(58) Field of Classification Search ............ 244/3.1–3.3, 244/4 R, 17.11, 17.19, 75.1, 76 R, 175, 189, 244/190; 89/1.1, 1.11; 382/100, 103, 104; 701/1–18; 342/52–55, 60–68, 89, 90, 175, 342/192–197; 348/169–172

See application file for complete search history.

(56) References Cited

U.S. PATENT DOCUMENTS

| 2,769,601 A | * | 11/1956 | Hagopian et al. | ............ 244/3.14 |
|---|---|---|---|---|
| 2,838,255 A | * | 6/1958 | Hagopian et al. | ............ 244/3.14 |
| 2,989,640 A | * | 6/1961 | Turck | ........................... 244/3.14 |
| 3,073,550 A | * | 1/1963 | Young | ......................... 244/3.11 |

(Continued)

FOREIGN PATENT DOCUMENTS

EP    0740123 A1    10/1996

OTHER PUBLICATIONS

"Predator/MQ-1 Predator"; no author given; no date given; General Atomics Aeronautical Systems, Inc., Poway, California, USA; posted on the Internet at ga-asi.com.*

(Continued)

*Primary Examiner* — Bernarr Gregory
(74) *Attorney, Agent, or Firm* — Shumaker & Sieffert, P.A.

(57) ABSTRACT

The present invention provides apparatus and methods for accurate guidance of small munitions to a target. The guidance for the small munition is mainly provided by a device external to the small munition, such as an unmanned aerial vehicle (UAV). The UAV may provide external guidance commands by use of a command transmitter to the small munition. The small munition is equipped to receive the guidance commands and consequently use a maneuvering mechanism to react to the guidance commands. The UAV may determine a successful release point of the small munition and track a flight path from a release point toward the target of the small munition using a passive sensor mounted in a gimbaled mount, which is controlled by use of a closed-loop control system. The UAV may be controlled by a ground control device, such as an operator control unit (OCU), to release small munitions.

19 Claims, 9 Drawing Sheets

U.S. PATENT DOCUMENTS

| | | | |
|---|---|---|---|
| 3,116,039 A * | 12/1963 | Goldberg | 244/3.11 |
| 3,126,172 A * | 3/1964 | Parkinson et al. | 244/3.13 |
| 3,141,634 A * | 7/1964 | Rhoades et al. | 244/3.14 |
| 3,156,435 A * | 11/1964 | Norton et al. | 244/3.14 |
| 3,168,264 A * | 2/1965 | Sendles | 244/3.14 |
| 3,169,726 A * | 2/1965 | Jackson | 244/3.14 |
| 3,179,355 A * | 4/1965 | Pickering et al. | 244/3.14 |
| 3,360,215 A * | 12/1967 | Cohen et al. | 244/3.14 |
| 3,362,657 A * | 1/1968 | McDaniel | 244/3.19 |
| 3,415,465 A * | 12/1968 | Bedford | 244/3.14 |
| 3,469,260 A * | 9/1969 | Holt et al. | 244/3.14 |
| 3,557,304 A * | 1/1971 | Rue et al. | 244/3.14 |
| 3,564,134 A * | 2/1971 | Rue et al. | 244/3.14 |
| 3,742,495 A * | 6/1973 | Diamantides | 342/64 |
| 3,778,007 A * | 12/1973 | Kearney et al. | 244/3.14 |
| 3,798,795 A * | 3/1974 | Michelsen | 342/55 |
| 3,820,742 A * | 6/1974 | Watkins | 244/3.11 |
| 3,876,308 A | 4/1975 | Alpers | |
| 3,891,985 A * | 6/1975 | Oigarden et al. | 342/60 |
| 3,943,357 A * | 3/1976 | Culver | 244/175 |
| 4,267,562 A | 5/1981 | Raimondi | |
| 4,296,894 A * | 10/1981 | Schnabele et al. | 244/3.27 |
| 4,396,878 A * | 8/1983 | Cole et al. | 244/3.15 |
| 4,562,439 A * | 12/1985 | Peralta et al. | 342/196 |
| 4,795,111 A * | 1/1989 | Moller | 244/17.19 |
| 4,959,714 A * | 9/1990 | Lo et al. | 348/172 |
| 4,972,193 A * | 11/1990 | Rice | 342/90 |
| 5,062,586 A | 11/1991 | Hobson et al. | |
| 5,114,227 A | 5/1992 | Cleveland, Jr. | |
| 5,208,757 A * | 5/1993 | Appriou et al. | 701/3 |
| 5,521,817 A * | 5/1996 | Burdoin et al. | 701/3 |
| 5,560,567 A * | 10/1996 | Hallmark | 244/3.14 |
| 5,581,250 A * | 12/1996 | Khvilivitzky | 382/104 |
| 5,637,826 A * | 6/1997 | Bessacini et al. | 244/3.11 |
| 5,652,588 A * | 7/1997 | Miron | 342/54 |
| 5,708,583 A | 1/1998 | Solenne et al. | |
| 5,878,981 A * | 3/1999 | Dewey | 244/190 |
| 6,056,237 A | 5/2000 | Woodland | |
| 6,211,816 B1 * | 4/2001 | Westphal | 342/62 |
| 6,590,521 B1 * | 7/2003 | Saka et al. | 342/52 |
| 6,634,593 B2 * | 10/2003 | Lepretre et al. | 244/189 |
| 6,665,594 B1 | 12/2003 | Armstrong | |
| 6,672,534 B2 * | 1/2004 | Harding et al. | 244/3.15 |
| 6,744,397 B1 * | 6/2004 | Hager et al. | 342/55 |
| 6,871,816 B2 * | 3/2005 | Nugent et al. | 244/3.16 |
| 6,873,886 B1 | 3/2005 | Mullen et al. | |
| 6,895,102 B2 * | 5/2005 | Lewins et al. | 382/103 |
| 6,940,994 B2 * | 9/2005 | Nixon et al. | 382/100 |
| 6,940,999 B2 * | 9/2005 | Lin | 382/103 |
| 6,952,001 B2 * | 10/2005 | McKendree et al. | 244/3.1 |
| 6,972,714 B1 * | 12/2005 | Baharav et al. | 342/175 |
| 7,032,858 B2 * | 4/2006 | Williams | 244/3.15 |
| 7,148,835 B1 * | 12/2006 | Bricker et al. | 342/195 |
| 7,210,654 B1 | 5/2007 | Cox et al. | |
| 7,425,693 B2 * | 9/2008 | Shapira | 244/3.1 |
| 7,425,918 B2 | 9/2008 | Rastegar et al. | |
| 7,492,308 B2 * | 2/2009 | Benayahu et al. | 342/52 |
| 7,537,181 B2 * | 5/2009 | Owens et al. | 244/3.14 |
| 7,551,989 B2 * | 6/2009 | Knotts et al. | 701/3 |
| 2002/0005942 A1 | 1/2002 | Perry | |
| 2005/0051667 A1 * | 3/2005 | Arlton et al. | 244/17.11 |

OTHER PUBLICATIONS

European Search Report for EP Application 08167877, Apr. 3, 2009.
Examination Report from corresponding EP Application No. 08167877.3, mailed Jun. 4, 2009, 5 pages.

* cited by examiner

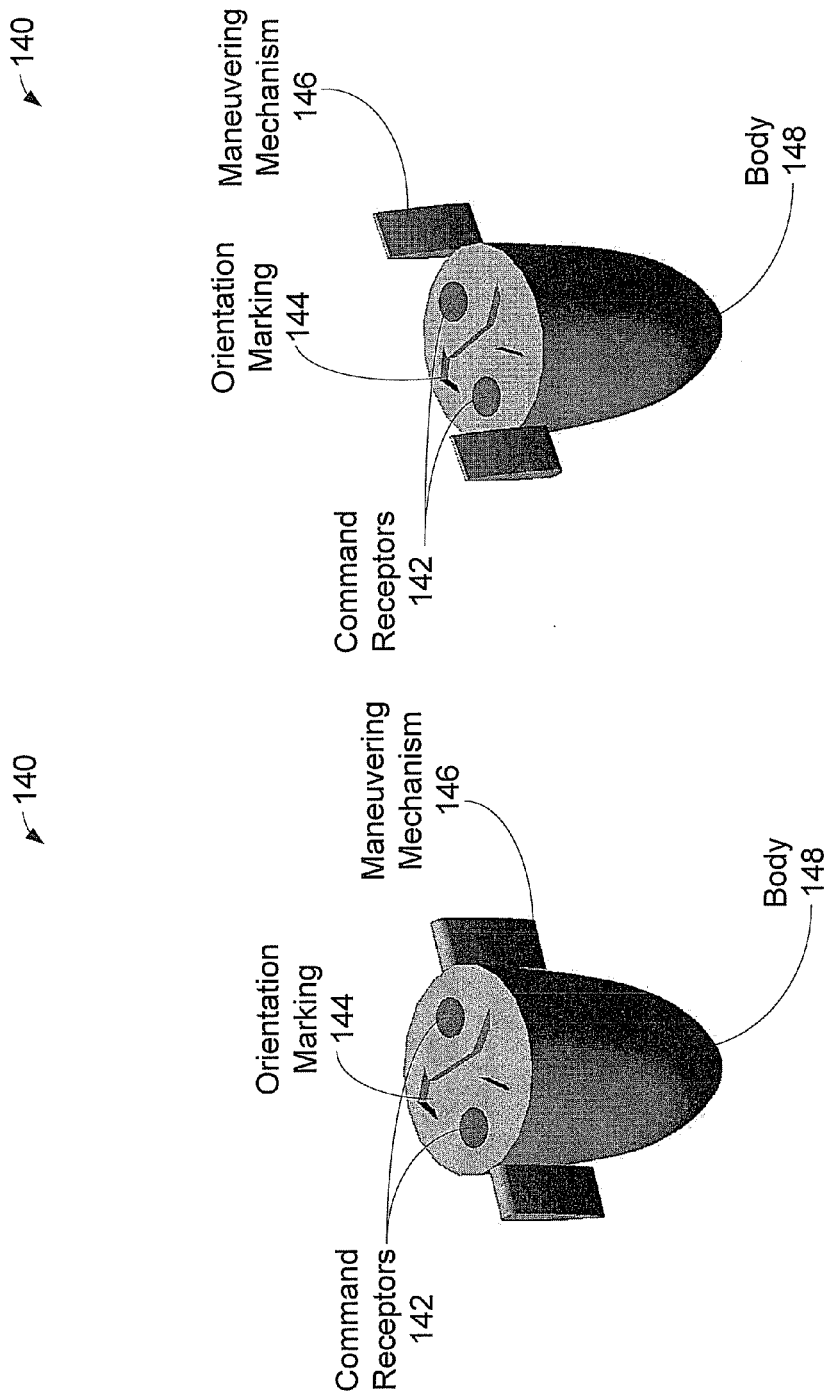

GUIDED DELIVERY OF SMALL MUNITIONS FROM AN UNMANNED AERIAL VEHICLE

CROSS-REFERENCE TO RELATED APPLICATIONS

The present application claims priority to U.S. Provisional Patent Application No. 60/983,551 filed on Oct. 29, 2007 entitled "Guided Delivery of Small Munitions from an Unmanned Aerial Vehicle", the entire contents of which are incorporated herein for all purposes.

FIELD OF THE INVENTION

The present invention relates generally to delivering munitions from an aerial vehicle and, more particularly, to delivering small munitions from an unmanned aerial vehicle to a target.

BACKGROUND

Unmanned Air Vehicles (UAVs) are used for a variety of missions such as reconnaissance, surveillance and target acquisition. Typically a UAV launches and executes a mission by flying to one or more points of interest along a predefined route. An operator may load the launch location, points of interest, and landing location into the UAV as a mission flight plan that the operator develops using a flight planner or ground control station with a graphical user interface. Once launched, the UAV can execute the mission flight plan autonomously or with varying degrees of remote operator guidance.

UAVs may be deployed for various missions and may have numerous capabilities, including the ability to carry munitions. For example, a small UAV may be primarily used for reconnaissance, surveillance and targeting activities and thus have various sensors to carry out these missions. However, the small UAV also may carry munitions to attack and/or harass targets. As the small UAV typically has a limited carrying capacity for carrying munitions, the munitions themselves may be fairly small. Some small munitions may be manufactured to be inexpensive. For example, there may be a limited amount of on-board processing power on the light munition for target guidance. Also, some inexpensive or light-weight small munitions may not be equipped with engines or other propulsion sources.

SUMMARY

Embodiments of the present application include methods, systems, and apparatus for accurate guidance of small munitions.

A first embodiment of the invention provides a system for delivering and guiding a light munition from an unmanned aerial vehicle (UAV) to a target. The system includes a passive sensor, a command transmitter, a first radio, and a feature processing device. The passive sensor provides a sensor output corresponding to an area traversed by the UAV. The passive sensor is capable of being articulated with respect to the UAV as controlled by a gimbal controller. The command transmitter is for transmitting commands from the UAV to the light munition. The light munition has at least one command receptor for receiving the commands. The commands assist in guiding the light munition to the target. The first radio is mounted on the UAV. The first radio transceives communications to and from a ground control system. The ground control system includes an operator control unit. The operator control unit has a second radio, a display, and a user input mechanism to allow a user to select and transmit to the first radio one or more image features corresponding to the target. The feature processing device operates the UAV by processing sensor data received from the gimbaled sensor. The feature processing device determines commands to be transmitted by the command transmitter based on the received sensor data.

A second embodiment of the invention provides a method for sending commands to a light munition. A target is determined. The light munition is released. The flight path of the light munition is observed by use of a passive sensor. A determination is made that the light munition is on target based on the observed flight path. Responsive to determining the light munition is not on target, a command is sent to the light munition while the light munition is in flight.

A third embodiment of the invention comprises a feature processing device. The feature processing device includes a sensor payload, a gimbal controller, and a control processor. The sensor payload includes a passive sensor mounted in a gimbaled mount. The gimbal controller is configured to use a closed-loop control technique to control the gimbaled mount. The control processor is configured to process sensor data from the passive sensor and to generate guidance commands for a small munition.

BRIEF DESCRIPTION OF THE DRAWINGS

Embodiments of the present invention are described below in conjunction with the appended drawings. The drawings are only for the purpose of illustrating embodiments of the present invention and are not to be construed as limiting the invention.

Various examples of embodiments are described herein with reference to the following drawings, wherein like numerals denote like entities, in which:

FIGS. 4A, 4B, and 4C are pictorial representations of light munitions that may be utilized with various embodiments of the present invention;

DETAILED DESCRIPTION

Figure 1A:
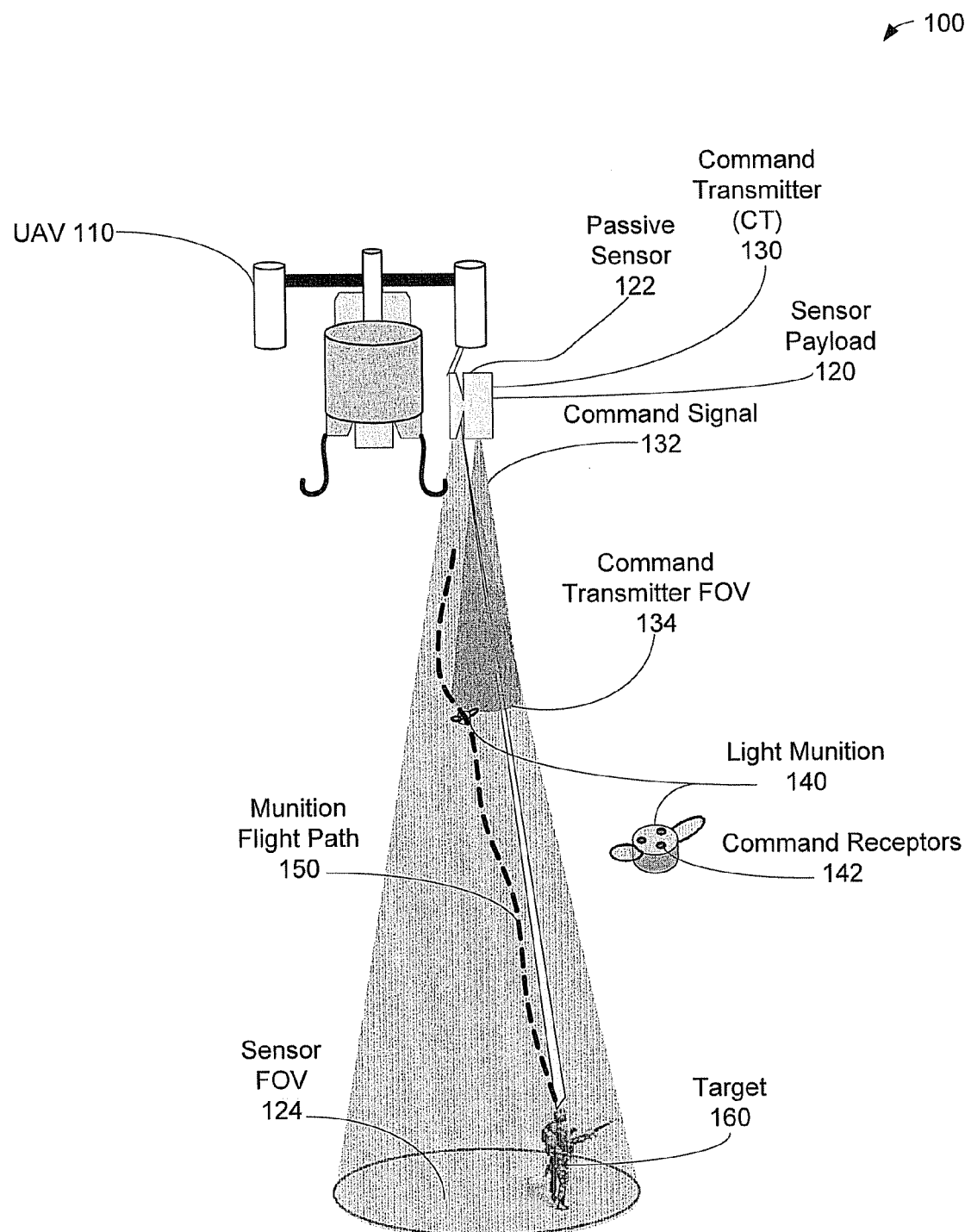
FIG. 1A is a pictorial representation of a small munitions delivery system guiding a light munition toward a target, in accordance with embodiments of the invention.

The present invention provides apparatus and methods for accurate guidance of small munitions to a target. Accurate guidance of small munitions is particularly important as a small munition may not carry a large payload, and thus may have to be delivered accurately to damage or destroy the target.

The guidance for the small munition is mainly provided by a device external to the small munition, such as a UAV. As such, the small munition is assumed to have (a) inputs for receiving guidance commands and (b) a maneuvering mechanism for reacting to the (externally provided) guidance commands. Example guidance commands include rotate right, rotate left, rotate rate, fly forward, and forward speed.

As described herein, a UAV may provide the external guidance commands by use of a command transmitter to the small munition. The command transmitter may be a laser or infrared (IR) emitter configured to send the guidance commands to the small munition. The small munition is equipped with one or more command receptors to receive the guidance commands. The specific command receptors on the small munition depend on the type and/or frequency of a carrier of the commands; for example, laser sensors may be used to receive commands from a laser acting as the command transmitter.

Then, the small munition may react to the guidance commands by changing the configuration of the maneuvering mechanism. For example, if the maneuvering mechanism is one or more actuatable wings or vanes, the actuatable wing(s)/vane(s) may change position in response to a guidance command. If the small munition is equipped with a maneuvering mechanism that includes a propulsion source, appropriate guidance commands may be provided to the small munition to control the propulsion source as well (e.g., fly forward at 20 kilometers/hour or stop the propulsion source).

The UAV may carry one or more small munitions and release the small munition, one at time or simultaneously, toward a target. For each small munition, the UAV may track a flight path from a release point toward the target of the small munition using a sensor, such as a passive sensor. Example passive sensors are electro-optical/IR (EO/IR) devices, video cameras, motion sensors, heat sensors, audio sensors, wind sensors, and non-visible-light sensors (e.g., IR or ultra-violet light sensors). The passive sensor may be mounted on one or more gimbals to permit articulation along one or more degrees of freedom. The UAV may have logic, such as a field of view (FOV) centering module, to keep the small munition within observable range of the passive sensor. The FOV centering module may center the field of view of the passive sensor on the small munition and/or the target. Further, the FOV centering module or other logic aboard the UAV may ensure that the small munition is also within the FOV of the command transmitter. The small munition may be marked with an identifiable design, such as an orientation mark, for ready identification of the small munition by the passive sensor.

The UAV may determine a successful release point for the small munition based on wind conditions, target position, mobility range of the small munition, and other considerations, such as the FOV of the command transmitter. Further, the UAV may be controlled by a ground control device, such as an operator control unit (OCU), to release small munitions. The OCU may identify potential or actual targets based on features identified in video images taken by the passive sensor. The UAV and OCU may communicate using suitably configured radios in each device. Once identified, a user of the OCU, such as an airman or soldier, may request the UAV release a small munition toward the target. In general, the small munition does not have a propulsion source, so upon release, the small munition may fall toward the target. The user and/or the UAV may determine the small munition is on course to reach the target, but if not, the UAV may send guidance commands to the small munition. The payload of the small munition is then delivered to the target once the small munition reaches the target.

An Example Small Munitions Delivery System

Turning to the figures, FIG. 1A is a pictorial representation of a small munitions delivery system 100 guiding a light munition 140 toward a target 160, in accordance with embodiments of the invention. The delivery system 100 comprises a UAV 110, such as a hovering ducted fan UAV. In alternate embodiments, the UAV 110 may be replaced by another device and/or person (e.g., a manned aircraft or observer atop a canyon) performing the herein-described tasks of the UAV 110.

FIG. 1A shows the UAV 110 comprising a sensor payload 120, which in turn comprises a passive sensor 122 and a command transmitter 130. The sensor payload 120 may be held within a gimbaled mount. The gimbaled mount may permit the sensor payload 120 to be articulated along one or more degrees of freedom. The gimbaled sensor may be stabilized by use of a gyroscope or other inertial stabilization device to stabilize the gimbaled mount.

The passive sensor 122 may comprise a video camera. In alternative embodiments, different types of sensors may be used as the passive sensor 122 and/or in addition to the video camera, such as motion sensors, heat sensors, audio sensors, wind sensors, electro-optical (EO), non-visible-light sensors (e.g. IR sensors), and/or EO/IR sensors. In addition, more than one type of sensor may be utilized as passive sensor 122, e.g., a video camera and a motion detector. The choice of sensor type may depend on the characteristics of the intended target and those of its surroundings. The passive sensor 122 may have a sensor field of view (FOV) 124 associated with it.

The UAV 110 may carry one or more light munitions 140. The UAV 110 may be configured to release one or more of the light munitions 140 toward one or more targets. FIG. 1A shows a light munition 140 after release from the UAV 110 traveling along the munition flight path 150 toward the target 160. The one or more targets may be within the sensor FOV 124 of the UAV 110. When the target(s) are within the sensor FOV 124, the UAV 110 may be able to track the position of both the light munition 140 and the target 160 as the light munition 140 travels along the munition flight path 150. To guide the light munition 140 along the munition flight path 150, the UAV 110 may send one or more guidance commands to the light munition 140 via the command transmitter 130 and the light munition 140 may be equipped with command receptors 142 to receive the guidance commands.

The command transmitter 130 may be a broad beam laser configured to transmit an infrared command signal 132 to an appropriately equipped light munition 140. In alternative embodiments, the command transmitter 130 may be a radio frequency (RF) transmitter, an RF transceiver, a laser tuned to one or more other frequencies (e.g., a visible light frequency) or other device suitable to enable the herein-described communications, such as guidance commands, between the delivery system 100 and the light munition 140.

The command transmitter 130 has an associated command transmitter FOV 134. Since the command transmitter 130 is preferably attached to (and/or part of) the sensor payload 120, the command transmitter FOV 134 preferably tracks the sensor FOV 124 in some sense. In the illustrated embodiment, the sensor FOV 124 is wider than the command transmitter FOV 134. However, in other embodiments the sensor FOV 124 may be narrower or the same size as the command transmitter FOV 134.

The command receptors 142 on the light munition 140 will determine what type of communication technique is used. For example, if the command transmitter 130 is a broad beam infrared laser, the command receptors 142 may be open loop infrared sensors. As another example, if the command transmitter is an RF transmitter transmitting at a known frequency, the command receptors 142 may be RF receivers tuned to the known frequency.

Figure 1B:
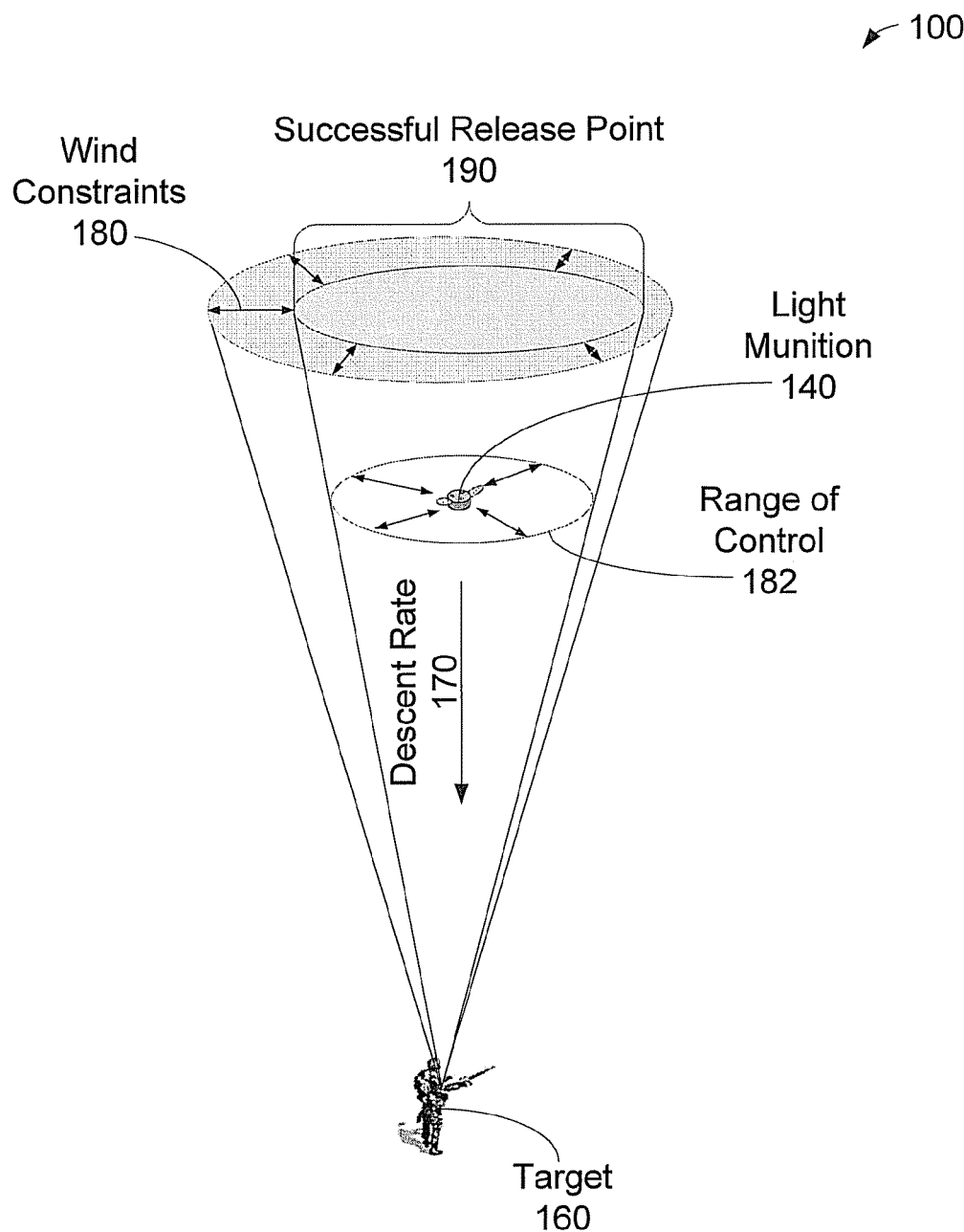
FIG. 1B is a pictorial representation of a determination of a successful release point of a light munition capable of being guided toward a target, in accordance with embodiments of the invention.

FIG. 1B is a pictorial representation of a determination of a successful release point 190 of a light munition 140 guided toward a target 160, in accordance with embodiments of the invention. The successful release point 190 is determined based on the light munition 140 descending toward the target at a known descent rate 170, the munition lateral mobility capability, the release altitude above the target 160, and the given wind constraints 180. Sensor payload 120 may comprise one or more wind sensors or anemometers. Based on data from the wind sensors, the small munitions delivery system 100 may determine the wind constraints 180. Also, the small munitions delivery system 100 may determine a range of control 182 of the light munition 140. The range of control 182 may indicate an area in which the small munition 140 is able to displace its lateral position during descent toward the target 160. The successful release point 190 may be determined based on the position of the target 160.

An Example Feature Processing Device

Figure 2:
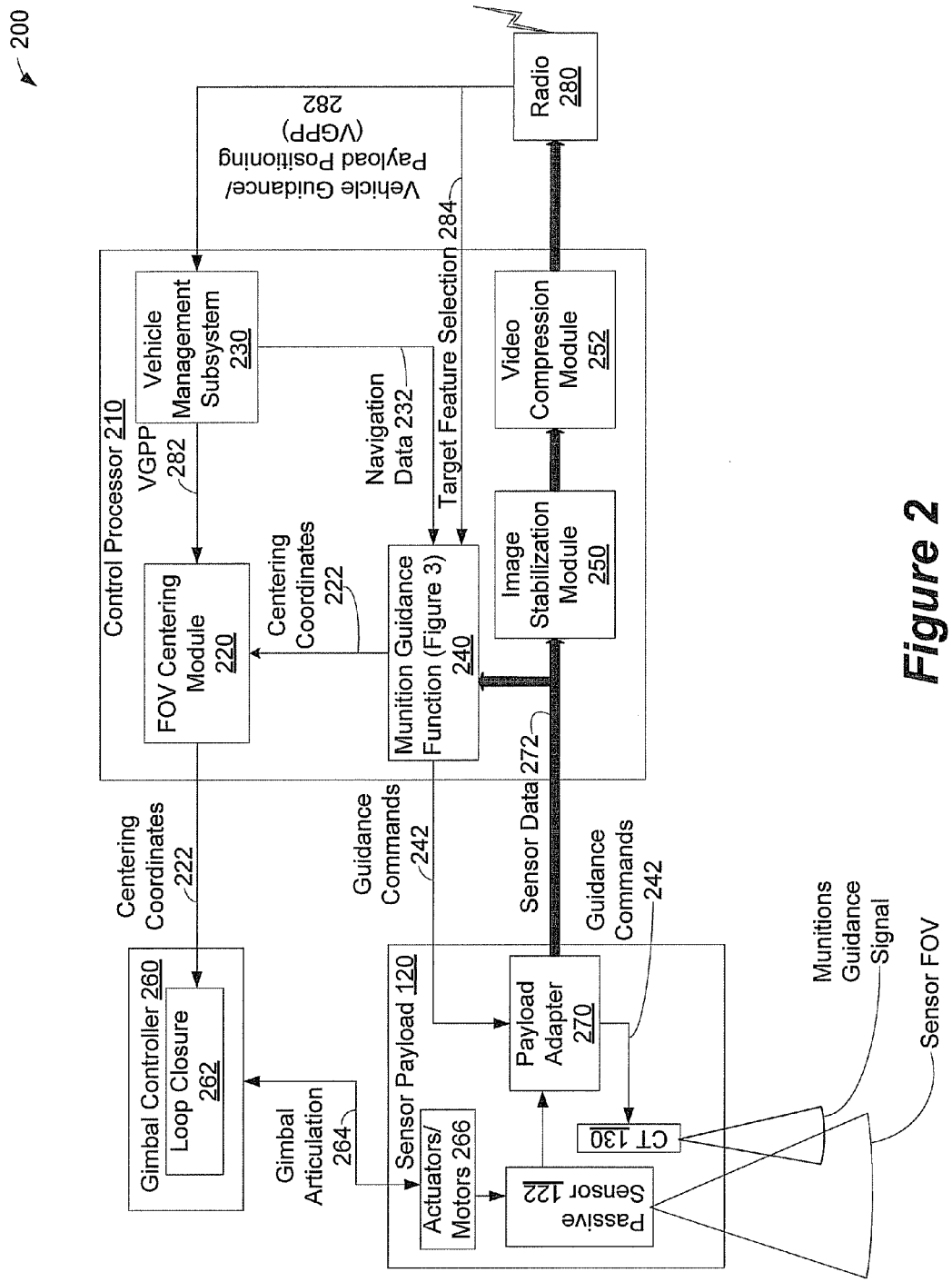
FIG. 2 is a block diagram illustrating a feature processing device, according to embodiments of the present invention.

FIG. 2 is a block diagram illustrating a feature processing device 200 that may be utilized in the small munitions delivery system 100 according to embodiments of the present invention. In general, the feature processing device 200 provides functionality to support the following: an inertial mechanically gimbalized/stabilized sensor payload, digital image stabilization, target feature extraction and selection, image feature-based centering correction, maintaining munitions positioning to target features, and commands to munitions for correcting guidance of small munitions. The UAV 110 may carry the feature processing device 200 aboard to use the above-mentioned functionality.

The feature processing device 200 includes a control processor 210, a gimbal controller 260, a radio 280 which may be used for communicating with the ground control system 600 (described below in more detail with reference to FIG. 6), and the sensor payload 120. The control processor 210 includes a FOV centering module 220, a vehicle management subsystem 230, a munitions guidance function 240, an image stabilization module 250, and a video compression module 252.

The FOV centering module 220 may be used to keep both a small munition 140 and the target 160 in the field of view of the passive sensor 122 and/or the control transmitter (CT) 130. The FOV centering module 220 receives centering coordinates 222 from the munitions guidance function 240 and generates elevation and/or azimuth pointing commands that may be used by the gimbal controller 260. The centering coordinates 222 may modify basic gimbal positioning data in vehicle guidance/payload positioning data 282 generated by the vehicle management subsystem 230.

The vehicle management subsystem 230 may perform one or more of the following functions: inertial sensing, vehicle control and guidance, coordinate transformation, and payload positioning. To perform these functions, the vehicle management subsystem 230 may generate vehicle guidance/payload positioning data 282, perhaps based on data provided by the radio 280, as input to be passed on to the FOV centering module 220. The vehicle management subsystem 230 may generate navigation data 232 from the vehicle guidance/payload positioning data 282 as well.

The munitions guidance function 240, described in more detail with respect to FIG. 3 below, may be used to provide guidance commands for controlling the light munition. The munitions guidance function 240 may take target feature selection 284 and the navigation data 232 as inputs. The target feature selection 284 may be provided via the radio 280. The munitions guidance function 240 may then determine centering coordinates 222 for use by the FOV centering module 220 and guidance commands 242 for the payload adaptor 270 to relay to the light munition 140 via the command transmitter 130. FIG. 2 shows a munitions guidance signal, which may include the guidance commands 242.

The radio 280 may receive the vehicle guidance/payload positioning data 282 and/or the target feature selection data 284, perhaps from a ground control system 600 (described in more detail with respect to FIG. 6 below). The vehicle guidance/payload positioning data 282 and/or the target feature selection 284 may be defined by a user using the operator control unit 610 (described in detail below with respect to FIG. 6). As such, the UAV 110, when utilizing the feature processing device 200 and the radio 280, may receive commands in the vehicle guidance/payload positioning data 282 to direct the UAV 110 and/or commands in the target feature selection data 284 for targeting munitions carried by the UAV 110 such as light munition 140.

The passive sensor 122 may provide (video) sensor data 272 (shown for clarity only as a thick arrow throughout FIG. 2) via the payload adaptor 270 to an image stabilization module 250. The image stabilization module 250 may be used to digitally stabilize and/or center the small munition, the target, or another feature in received (video) sensor data within the images received. The image stabilization module 250 may stabilize the images received based on a sensed condition associated with the image feature, such as detected movement of the target within the image or the sensed orientation mark (and thus orientation or position) of the small munition within the image.

The centered and stabilized images may then be passed on to a video compression module 252 for compression, to allow a user of the ground control system 600 to view (video) sensor data 272 from the passive sensor 122 of the sensor payload 120. The use of compressed images permits reduction of the bandwidth needed to transmit the video via the radio 280.

The sensor data 272 may be processed by computer software to display the sensor data to a user. In the case where the sensor data 272 is video data, the computer software may be a video player application, such as a (streaming) video player capable of displaying video data, including compressed video data. For other types of sensor data 272, other computer software may be utilized for display, such as image processing software for video data taken in visible and/or invisible light spectra, such as infra-red or ultra-violet video data, audio processing software for audio data, meteorological software for wind, temperature, and/or humidity data, and the like. Other types of sensor data 272 and computer software are possible as well.

The radio 280 may receive the sensor data 272 from the video compression module 252 and then send the sensor data 272 to the ground control system 600. The sensor data 272 may then be used by the ground control system 600 to monitor the UAV 110, including providing feedback about execution of any commands received by the UAV 110 in the vehicle guidance/payload positioning data 282 and/or the target feature selection data 284.

The gimbal controller 260 may perform a closed-loop payload positioning sequence by use of loop closure 262 to generate image stabilized gimbal articulation information 264. The gimbal articulation information 264 may be received by one or more actuators and motors 266. Based on the gimbal articulation information 264, the actuators and motors 266 may move the gimbals (not shown in FIG. 2) holding the passive sensor 122. That is, the loop closure 262 of the gimbal controller 260 uses feedback from the passive sensor 122, in the form of the centering coordinates 222 which are derived from sensor data 272 by the munition guidance function 240, to control the pointing of the passive sensor 122 via the actuators and motors 266.

According to a preferred embodiment, the gimbaled sensor payload 120 includes a passive electro-optical/infrared (EO/IR) sensor 122, a laser to be used as the command transmitter 130, and a USB payload adapter 270. The USB payload adapter 270 receives an output from the passive sensor 122 and provides a sensor data output to the control processor 210. The USB payload adapter 270 also receives and provide guidance commands 242 to the command transmitter 130.

An Example Munitions Guidance Function

Figure 3:
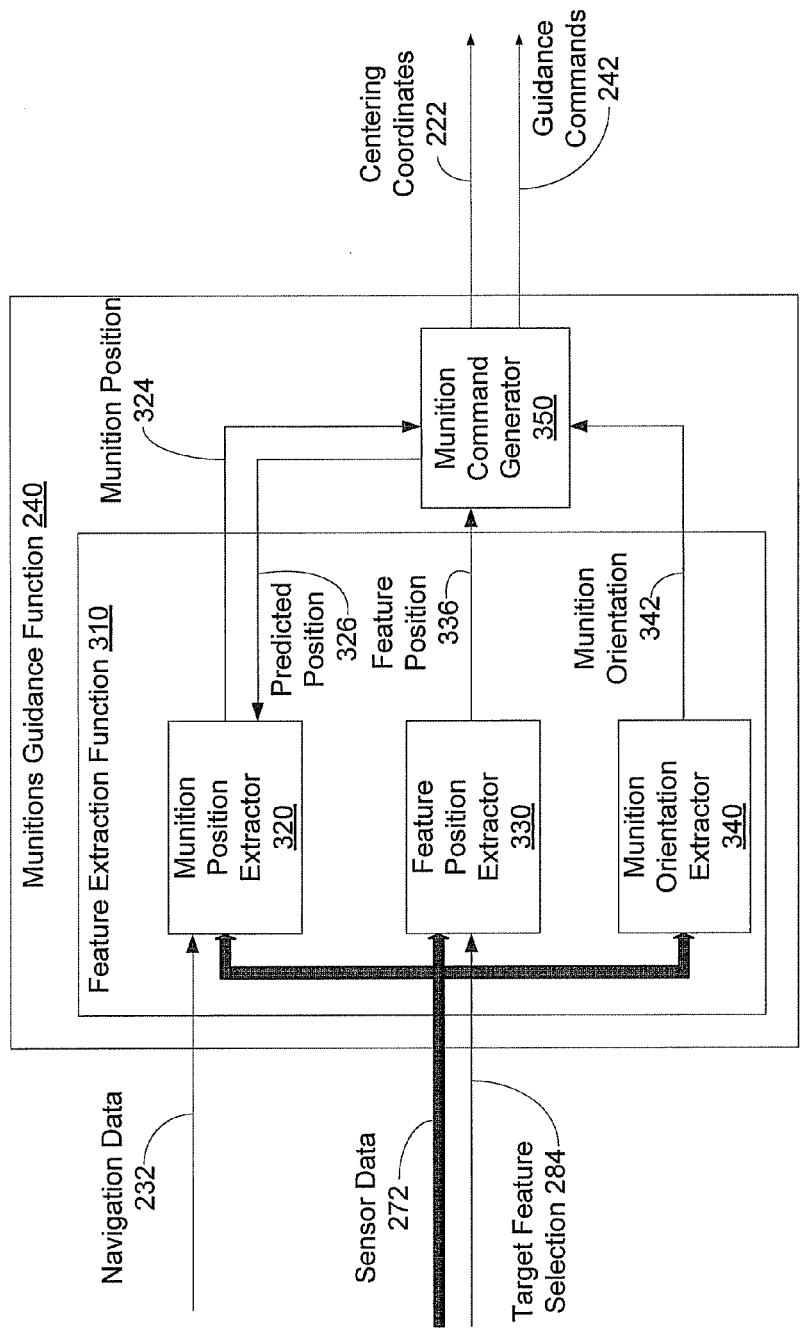
FIG. 3 is a block diagram of a command decoder, in accordance with embodiments of the invention.

FIG. 3 is a block diagram illustrating further details of the munitions guidance function 240, in accordance with embodiments of the present invention. The munitions guidance function 240 receives the navigation data 232, sensor data 272, and target feature selection 284 as inputs at a feature extraction function 310 and generates the centering coordinates 222 and guidance commands 242 via a munition command generator 350 as outputs. For clarity only, sensor data 272 is shown using a thick arrow throughout FIG. 3. These inputs are received by the feature extraction function 310 of the munitions guidance function 240.

The navigation data 232, sensor data 272, and target feature selection 284 are as described above with respect to FIG. 2.

The munition position extractor 320 correlates the navigation data 232 to the sensor data 272 to determine a munition position 324 relative to an operator selected feature, such as operator selected feature 652 described below with respect to FIG. 6. The feature position extractor 330 identifies one or more feature outlines that the operator can select. The coordinates of the selected feature are sent to the munitions command generator 350.

The munition orientation extractor 340 determines munition orientation 342, such as feature image position and azimuth orientation, from the sensor data 272. The munition orientation may be extracted from the sensor data 272 based on features of the small munition 140. For example, the munition orientation extractor 340 may be configured to identify an orientation marking on the small munition and determine the munition orientation 342 based on the identified orientation marking. The small munition 140, including orientation markings, is described in more detail with respect to FIGS. 4A-C below.

The munition command generator 350 may take the munition position 324, the feature position 336, and the munition orientation 342 as inputs. Based on the inputs, the munition command generator 350 may generate a position error value based on a closed loop control system. The munition command generator 350 may generate a position error value. The position error value may be generated by comparing the feature position 336 and the munition position 324. The direction of the position error value may be computed as relative to the munition orientation 342. Based on the determined position error value, guidance commands 242, such as munition effector command levels, and/or centering coordinates 222 (described above in more detail with respect to FIG. 2 above) are generated. Further, a predicted position 326 may be determined by the munition command generator 350, based on the munition position 324 and a prediction of a subsequent location of the light munition 140 based on the effect on the light munition 140 of the guidance commands 242. The predicted position 326 may also be fed back to the munition position extractor 320 to aid in locating the small munition 140 in the sensor data 272. Also, the munition command generator 350 may use the coordinates of the selected feature to generate an error correction command as part of the guidance commands 242.

The guidance commands 242 may be provided as pulsed optical (i.e., laser) or RF signals. As such, the guidance commands 242 may be emitted by a laser, radio, or other electromagnetic-radiation emitter for reception by a small munition, such as small munition 140. Therefore, the munition command generator 350 may comprise a laser capable of transmitting the guidance commands 242 (i.e., the munition command generator 350 may comprise the functionality of the command transmitter 130). Alternatively, the munition command generator 350 may provide instructions to the command transmitter 130 for emitting signals corresponding to the guidance commands 242.

Example Light Munitions

Figure 4C:
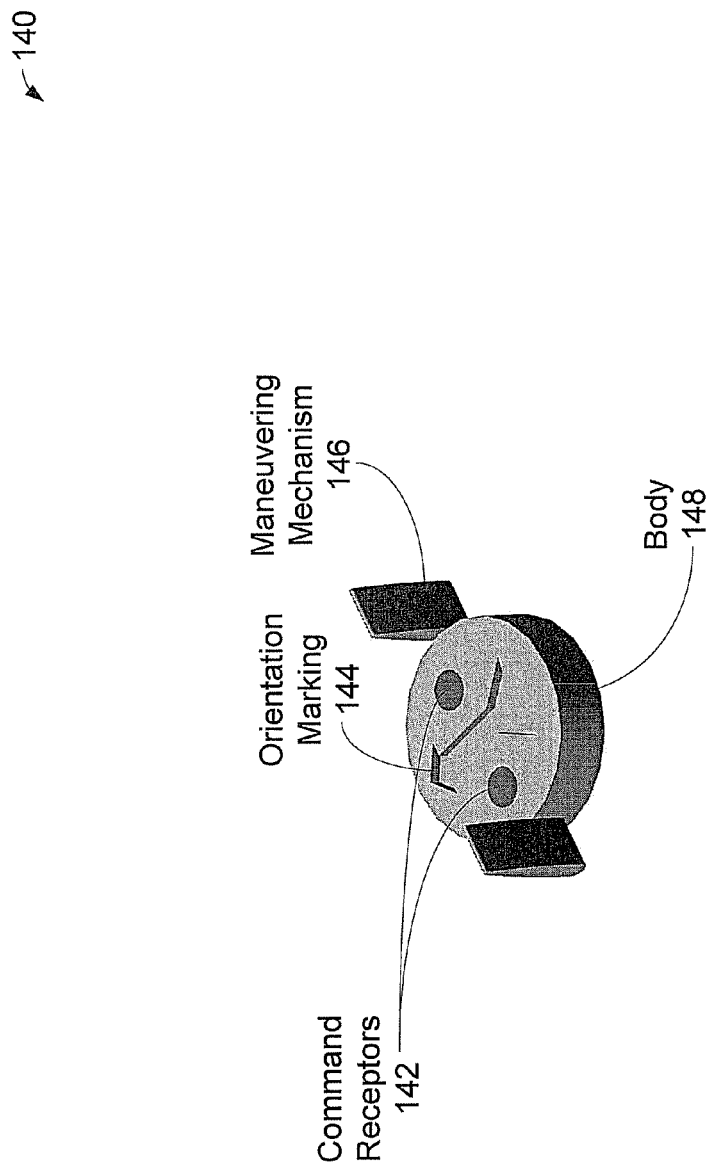

FIGS. 4A, 4B, and 4C are pictorial representations the light munition 140, in accordance with embodiments of the invention. The light munition 140 may include one or more command receptors 142 (e.g. optical or RF command receiver sensors), orientation or heading marking feature 144, a maneuvering mechanism 146, and a body 148. The command receptors 142 may be optical or other sensors (e.g., RF sensors) configured to receive signals from the command transmitter 130. The received signals may include commands for the light munition 140, such as rotate right, rotate left, rotate rate, fly forward, and forward speed. Other commands for the light munition 140 are possible as well. The command receptors 142 may include an optical or other transmitter capable of sending information, such as command acknowledgements, munition status information, and velocity/distance information, among other types of information back to the passive sensor 122 and/or command transmitter 130.

The orientation marking 144 may indicate a heading of the small munition 140. The orientation marking 144 may be detected by the passive sensor 122 to indicate an orientation of the small munition 140. Alternatively, the orientation marking 144 may be illuminated by a light source, such as a laser (e.g., the command transmitter 130) which would allow the orientation marking 144 to be more easily discriminated.

The maneuvering mechanism 146 may include actuatable wings or vanes and possibly a propulsion source. The maneuvering mechanism 146 may be positioned by commands received through the command signal 132 from small munitions delivery system 100. For example, if the small munition 140 depicted in FIG. 4A received a command via command receptors 142 to change position (e.g., rotate right), the small munition 140 may change the position of the vanes of the maneuvering mechanism 146 to the position shown in FIG. 4B.

The body 148 of the small munition 140 may include components of the small munition, such as control logic, sensors, actuator(s) and/or an engine for the maneuvering mechanism 146, and a payload. The payload may be an explosive or other military payload to be delivered to the target. The body 148 may take on different shapes and sizes, based on the payload to be delivered, the operating conditions of the small munition 140, and/or for other considerations. FIGS. 4A and 4B show the body 148 shaped in a shell-shape, whereas FIG. 4C shows the body 148 shaped as a disk.

An Example Munition Control System

Figure 5:
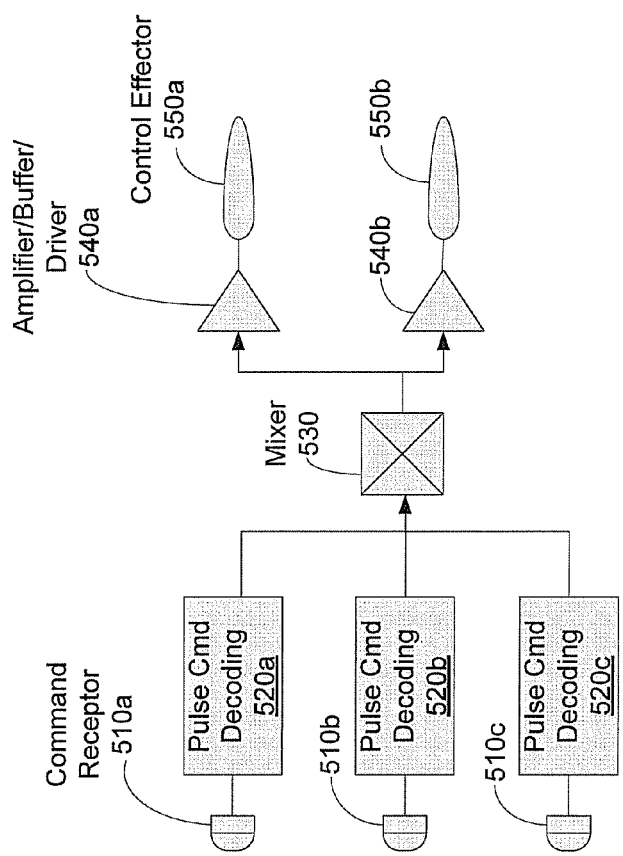
FIG. 5 is a schematic diagram showing a munition control system for a light munition, in accordance with embodiments of the invention.

FIG. 5 is a schematic diagram showing a munition control system 500 for the light munition 140, in accordance with embodiments of the invention. The munition control system 500 preferably includes a plurality of command receptors 510*a-c*, a corresponding plurality of pulse command decoders 520*a-c*, a mixer 530, amplifier/buffer/driver stages 540*a*- b, and control effectors 550a-b (i.e., maneuvering mechanisms, such as the maneuvering mechanism 146 shown in FIGS. 4A, 4B, and 4C). More than one command receptor and command decoder are preferably provided with the munition control system 500 to provide redundancy and to increase the likelihood that communications are received. Alternatively the command receptors 510a-c may each be sensitive to a specific frequency and the relative magnitude of their outputs may then provide the munition direction command.

The command receptors 510a-c may be optical receptors to receive commands coded by an optical laser source and/or RF receivers to receive commands coded as RF signals. Other types of command receptors are possible as well. A signal carrying the commands may be pulse-width modulated in one embodiment. Additionally, multiple signals with relative phasing may be sent and received. The particular coding schemes used determine the type of decoders 520a-c that are used. In a preferred embodiment, the munition control is displaced only when the received signal is pulsed; otherwise, the munition control remains in a neutral state. The munition control may store and maintain the last-received pulse position command.

An Example Ground Control System

Figure 6:
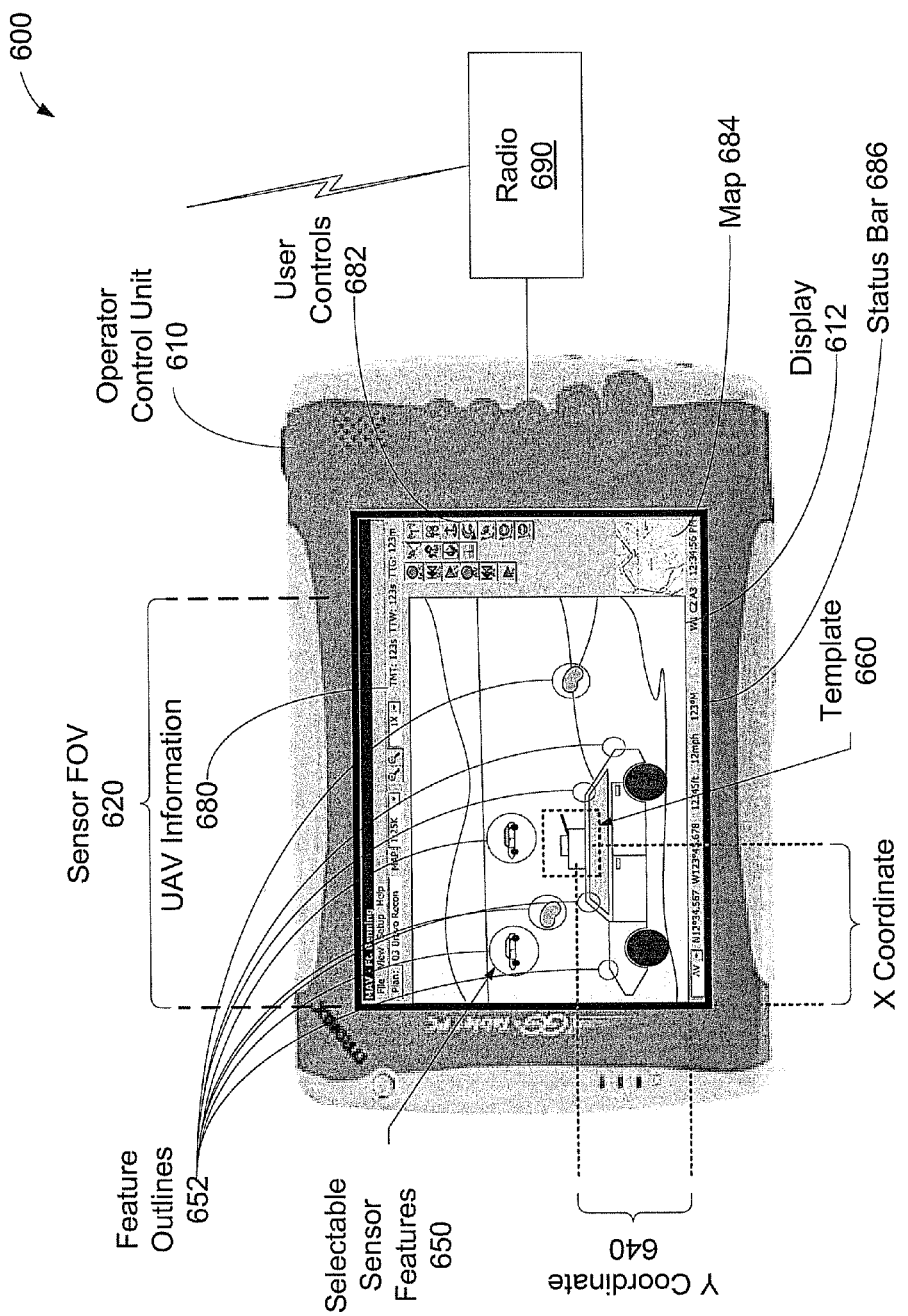
FIG. 6 is a pictorial representation of an operator control unit for the small munitions delivery system, in accordance with embodiments of the present invention.

FIG. 6 is a pictorial representation of a ground control system 600 for the small munitions delivery system 100, in accordance with an embodiment of the present invention. The ground control system 600 includes an operator control unit (OCU) 610, which is preferably some type of portable computer having at least a touch-sensitive display 612, a processor (not shown), and a radio (integrated or external) 690 to allow the OCU 610 to communicate with the delivery system 100 to control the UAV 110 and/or to receive video or other information.

The OCU 610 preferably includes a software application that displays information obtained by the sensor payload 120, including the passive sensor 122, on the delivery system 100. For example, the information may include a video or image feed to be displayed on the display 612. In the application shown, the display 612 portrays the sensor FOV 620 to allow the user to select an object in the FOV 620. The user may select an object using a coordinates system, such as X coordinate 630 and/or Y coordinate 640. The OCU 610 may display selectable sensor features 650. The selectable sensor features 650 may be outlined for ease of user identification. FIG. 6 shows feature outlines 652 depicted as circles located in various positions of the display 612. The feature outlines 652 may be depicted in other fashions as well, such as using different shapes, colors, and/or use of dynamic graphical characteristics (e.g., flashing or moving feature outlines). Also, the feature outlines 652 may be coded to indicate a priority of a feature; for example, on a reconnaissance mission for tanks, features that correspond to tanks may be depicted in a different color than feature that correspond to other potential targets, such as personnel carriers.

The user may select an object using a template 660. The user could, for example, make such a selection by touching the display with a finger or stylus. Based on that selection, the ground control system 600 can determine the image features and coordinates of the selected object (or an identified target within the selected object). Those coordinates may include an X-coordinate 630 and/or a Y-coordinate 640, for example. Additional coordinates and/or alternative coordinate systems could be utilized instead or as well. The OCU 610 can then transmit the image target coordinates 630 and 640 and/or sensor features 650 to the UAV 110 via the radio 690 (communicating perhaps with radio 280 discussed above with respect to FIG. 2) to allow the delivery system 100 to deliver a light munition 140 to the selected target 160 and/or to identify features of the target.

Note that the target shown in FIG. 1 differs from that shown in FIG. 6. FIGS. 1 and 6 depict two different, separate scenarios.

The OCU 610 may provide UAV information 680 such as, but not limited to, a flight plan of the UAV 110, a map used by the UAV 110, timing information, fuel information, and payload information (e.g., number of munitions carried, number of munitions in flight, number of munitions expended, type(s) of payloads of the munitions, etc.). Various user controls to permit the user to customize and select display features on the display 612 may be provided as user controls 682. The user controls 682 may permit customization of the OCU 610 as well. If one OCU 610 is monitoring images from multiple UAVs and/or passive sensors 120, the user controls 682 may permit switching or selection of the images from one or more of the multiple monitored UAVs. In such a scenario, the OCU 610 may permit the simultaneous display of images from multiple UAVs. The OCU 610 may also display a map 684 on the operator control unit 610. The map 684 may indicate an area of interest, such as the area being displayed in the video or image feed also displayed on the display 612. The map 684 may also correlate to a map used by the UAV 110 Also, the OCU 610 may display a status bar 686 indicating a current position being viewed, a current position of the UAV 110, and/or a current position of the OCU 610.

Radio 690 may be used to communicate with a radio 280 in the UAV 110 as described above. Also, radio 690 may be used to communicate with other devices, such as UAVs, OCUs or other communications devices used by other friendly forces, and data networks, such as public data networks, such as the Internet or secure data networks. For example, the OCU 610 may (re)transmit images received from UAV 110 on a data network, perhaps a secure data network, for review by other friendly force personnel, or may download features or templates from the data network. As another example, the map 684 and/or other information, such as meteorological information, may be retrieved from the data network for display on the OCU 610.

A Method for Guiding a Small Munition

Figure 7:
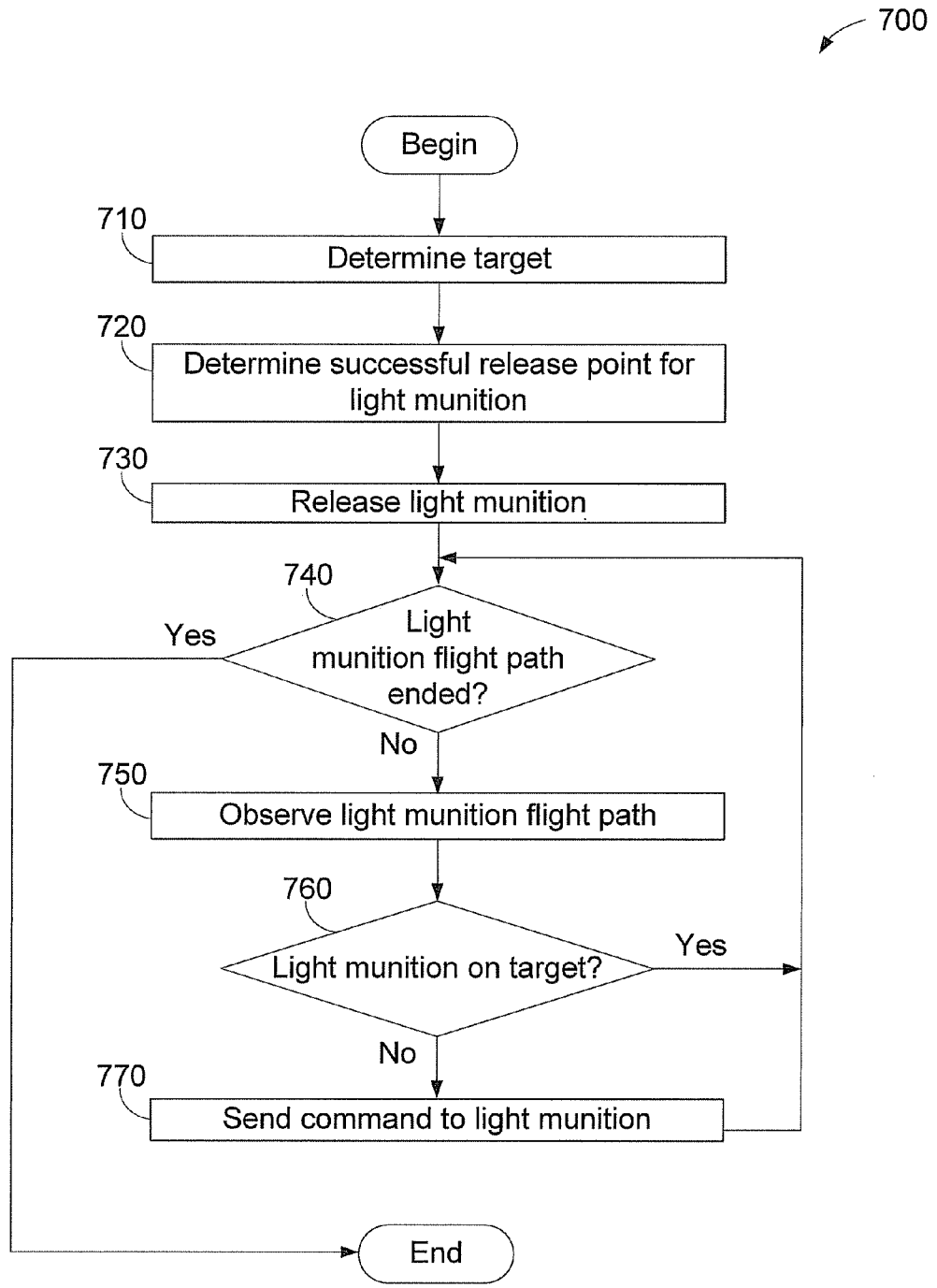
FIG. 7 is a flowchart depicting an example method for guiding a small munition, in accordance with embodiments of the present invention.

FIG. 7 is a flowchart of an example method 700 for guiding a small munition, in accordance with embodiments of the present invention. It should be understood that one or more of the blocks in this flowchart and within other flowcharts presented herein may represent a module, segment, or portion of computer program code, which includes one or more executable instructions that may be executed on one or more computer processors, specialized logic devices, or the like, for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Method 700 begins at block 710, where a target is determined. The target may be determined by image analysis. For example, one or more sensor features, such as features found in an image, may be determined to match a target template. Then, the target may be determined when the target template matches the sensor features. Similarly, the target may be determined when sensor features are selected by an operator to match a target. Alternatively, the target may be determined by selection by a human operator, by determination of a position in a coordinate system (e.g., latitude/longitude, or map grid coordinates), or by another determination technique.

At block 720, a successful release point is determined for a light munition. The light munition may be carried by a UAV before release. The successful release point may take into account characteristics of the target (e.g., location, speed, size, etc.), wind constraints, a rate of descent of the light munition, a range of control of the light munition, and the capabilities of the light munition (e.g., the maneuvering mechanism(s) of the light munition, propulsion systems on the light munition).

Also, characteristics of a payload of the light munition may affect the successful release point—for example, a payload capable of delivering more force against the target may have a different release point than a lighter payload. The payload may be non-lethal; for example, the payload of the light munition may be materiel for aiding friendly forces (e.g., a small communications device or component of a friendly force vehicle). Then, the light munition with a non-lethal payload may be guided toward an open area near the friendly forces.

At block 730, the light munition is released. The light munition may be released from the successful release point determined in block 720.

At block 740, a determination is made as to whether a flight path of the light munition has ended. The flight path of the light munition may end when the light munition has hit the target. Alternatively, the flight path may end when the light munition goes beyond observation of a passive sensor or a command signal used to respectively track or control the light munition. If the light munition goes beyond observation of the passive sensor and/or the command signal, the light munition may be equipped with a self-destruct mechanism and/or automatic disarming logic to disarm a lethal payload, such as logic that disarms the payload when the command signal is not sensed within a period of time.

If the flight path of the light munition has ended, method 700 may end. However, if the flight path of the light munition has not ended, method 700 proceeds to block 750.

At block 750, the flight path of the light munition may be observed. The flight path may be observed using a passive sensor. The passive sensor may be a video camera, motion detector, infra-red sensor, or other similar sensor. The output of the passive sensor may be transmitted to an operator control unit.

The passive sensor may be mounted in a gimbaled mount. The gimbaled mount may permit the articulation of the passive sensor along one or more degrees of freedom. As such, the passive sensor may be moved using the gimbaled mount without requiring movement of the UAV.

The passive sensor may move to track the flight path of the light munition. A gimbal controller may provide gimbal articulation to the gimbaled mount of the passive sensor to move the passive sensor. The gimbal articulation may be in the form of commands to the gimbaled mount. The gimbal articulation may be derived from centering coordinates received by processing sensor data generated by the passive sensor. As such, a gimbal controller may use a closed-loop control technique that takes input from the passive sensor, such as the centering coordinates, to control the gimbaled mount and thus, the passive sensor. In particular, the gimbal controller may control the gimbaled mount may move the passive sensor to track the small munition. The gimbal controller may have a loop closure to execute the closed-loop control technique.

At block 760, a determination is made as to whether the light munition is on target. For example, the determination may be made, in part by use of a velocity vector generator. The velocity vector generator may calculate a total velocity vector for the light munition. The total velocity vector may indicate the direction of the light munition. The current light munition position combined with the total velocity vector may determine an estimated munition position. The estimated munition position may be compared to a target position. The comparison of the estimated munition position and the target position may lead to generation of a position error; for example, the position error may be generated by subtracting the estimated munition position from the target position. Then, if the position error is less than a threshold (e.g., nearly zero), the light munition may be determined to be on target.

If the light munition is on target, method 700 may proceed to block 740. If the light munition is not on target, method 700 may proceed to block 770.

At block 770, a command may be sent to the light munition. The command may be sent while the light munition is in flight. The command may be a guidance command used to direct the light munition to change course toward the target. The guidance command may be generated based on a comparison of the light munition position and total velocity vector to the target vector, perhaps using the comparison techniques described above with respect to block 760. Example guidance commands are: rotate right, rotate left, rotate rate, fly forward, and change forward speed. After completing the procedures of block 770, method 700 may proceed to block 740.

Conclusion

Exemplary embodiments of the present invention have been described above. Those skilled in the art will understand, however, that changes and modifications may be made to the embodiments described without departing from the true scope and spirit of the present invention, which is defined by the claims. It should be understood, however, that this and other arrangements described in detail herein are provided for purposes of example only and that the invention encompasses all modifications and enhancements within the scope and spirit of the following claims. As such, those skilled in the art will appreciate that other arrangements and other elements (e.g. machines, interfaces, functions, orders, and groupings of functions, etc.) can be used instead, and some elements may be omitted altogether.

Further, many of the elements described herein are functional entities that may be implemented as discrete or distributed components or in conjunction with other components, in any suitable combination and location, and as any suitable combination of hardware, firmware, and/or software.

We claim:

1. A system for delivering and guiding a munition from an unmanned aerial vehicle (UAV) to a target, comprising:
   a passive sensor mounted on the UAV, the passive sensor providing a sensor output corresponding to a sensed condition associated with an area being traversed by the UAV, and the passive sensor capable of being articulated with respect to the UAV as controlled by a gimbal controller;
   a command transmitter for transmitting commands from the UAV to the munition, the munition having at least one command receptor for receiving the commands, and the commands assisting in guiding the munition to the target;
   a first radio mounted on the UAV for transceiving communications to and from a ground control system, the ground control system including an operator control unit having a second radio, a display, and a user input mechanism to allow a user to select and transmit to the first radio at least one image feature corresponding to the target; and a feature processing device for operating the UAV processing sensor data received from the gimbaled sensor, and determining commands to be transmitted by the command transmitter based on the received sensor data.

2. The system of claim 1, wherein the commands to be transmitted by the command transmitter include corrections determined by a closed loop control system that calculates a position error value.

3. The system of claim 2, wherein the position error value is on a position of the mutation.

4. The system of claim 1, wherein the gimbaled sensor is an optical sensor and wherein the command transmitter is an optical transmitter.

5. The system of claim 4, wherein the optical sensor is a video camera, wherein the optical transmitter is a broad beam infrared laser, and wherein the at least one command receptor is an open loop infrared sensor.

6. The system of claim 5, wherein the feature processing device stabilizes the sensor based on a sensed condition associated with the image feature.

7. The system of claim 1, wherein the operator control unit extracts an image position of the at least one image feature corresponding to the target and transmits that extracted image position to the first radio.

8. The system of claim 1, wherein the munition includes an orientation marking, and wherein a position and orientation of the munition are determined based on information in the sensor output.

9. A method of sending commands to a munition, comprising:
   determining a target;
   releasing the munition;
   using a passive sensor mounted on a gimbaled mount that is controlled by a controller, generating image data related to a flight path of the munition;
   determining centering coordinates for the passive sensor, wherein the centering coordinates are used to maintain the munition in a field of view of the passive sensor;
   controlling the controller with the centering coordinates to stabilize the image data from the passive sensor;
   determining if the munition is on target based on the image data related to the flight path; and
   responsive to determining the munition is not on target, sending a command from a control processor to the munition while the munition is in flight.

10. The method of claim 9, further comprising determining a possible successful release point for the munition before releasing the munition.

11. The method of claim 9, wherein the passive sensor is a video camera.

12. The method of claim 9, wherein controlling the controller with the centering coordinates further comprises articulating the passive sensor with the gimbaled mount to track the flight path of the munition.

13. The method of claim 9, further comprising:
   determining if the munition is within a field of view of a command transmitter configured to transmit a command signal, and
   responsive to determining the munition is not within a field of view of the command transmitter, disarming the munition.

14. A feature processing device, comprising:
   a sensor payload, comprising a passive sensor mounted in a gimbaled mount, wherein the passive sensor generates image data;
   a gimbal controller that uses a closed-loop control technique to control the gimbaled mount based on centering a field of view of the passive sensor around a feature extracted from the image data; and
   a control processor, configured to process the image data from the passive sensor and to generate guidance commands for a munition.

15. The feature processing device of claim 14, further comprising a radio, equipped to transmit the image data.

16. The feature processing device of claim 14, wherein the control processor is further configured to:
   transmit centering coordinate to the gimbal controller;
   receive vehicle guidance/payload positioning data as an input and generate navigation data;
   stabilize the image data; and
   receive the navigation data and generate the centering coordinates and the guidance commands for the munition.

17. The feature process device of claim 16, wherein the control processor is further configured to:
   extract a position of the munition from the image data and the navigation data;
   extract one or more feature positions based on the image data; and
   extract a munition orientation based on the image data.

18. The feature processing device of claim 17, wherein the control processor is further configured to generate the guidance commands and the centering coordinates based on the munition position, the one or more feature positions, and the munition orientation.

19. The feature processing device of claim 18, wherein the control processor is further configured to calculate a predicted position of the munition.

* * * * *